(12) United States Patent
Nam

(10) Patent No.: US 8,670,785 B2
(45) Date of Patent: Mar. 11, 2014

(54) METHOD AND SYSTEM FOR ACQUIRING POSITION OF TERMINAL

(75) Inventor: Kyung Bo Nam, Seoul (KR)

(73) Assignee: NHN Corporation, Seongnam-si (KR)

( * ) Notice: Subject to any disclaimer, the term of this patent is extended or adjusted under 35 U.S.C. 154(b) by 64 days.

(21) Appl. No.: 13/163,032

(22) Filed: Jun. 17, 2011

(65) Prior Publication Data

US 2011/0312345 A1 Dec. 22, 2011

(30) Foreign Application Priority Data

Jun. 18, 2010 (KR) .................. 10-2010-0058080

(51) Int. Cl.
*H04W 24/00* (2009.01)

(52) U.S. Cl.
USPC ............................................... 455/456.2

(58) Field of Classification Search
USPC ............. 455/456.1–456.6, 466, 41.2–41.3, 455/414.1, 418–420; 370/328, 338
See application file for complete search history.

(56) References Cited

U.S. PATENT DOCUMENTS

| | | | | |
|---|---|---|---|---|
| 7,047,022 | B2* | 5/2006 | Aoyama | 455/456.6 |
| 7,647,164 | B2* | 1/2010 | Reeves | 701/516 |
| 8,041,370 | B2* | 10/2011 | Pomerantz et al. | 455/456.1 |
| 2003/0100313 | A1* | 5/2003 | Ogino et al. | 455/456 |
| 2004/0260766 | A1* | 12/2004 | Barros et al. | 709/203 |
| 2008/0119200 | A1* | 5/2008 | McConnell | 455/456.1 |
| 2010/0029302 | A1* | 2/2010 | Lee et al. | 455/456.6 |
| 2010/0240398 | A1* | 9/2010 | Hotes et al. | 455/456.2 |
| 2010/0285818 | A1* | 11/2010 | Crawford | 455/456.3 |
| 2011/0111726 | A1* | 5/2011 | Kholaif et al. | 455/404.2 |
| 2011/0159862 | A1* | 6/2011 | Jackson | 455/418 |

FOREIGN PATENT DOCUMENTS

| | | |
|---|---|---|
| KR | 10-2003-0010318 | 2/2003 |
| KR | 10-2008-0092541 | 10/2008 |

* cited by examiner

*Primary Examiner* — Brandon Miller
(74) *Attorney, Agent, or Firm* — H.C. Park & Associates, PLC

(57) ABSTRACT

A method and system for acquiring a position of a terminal are provided. A position of a terminal incapable of measuring or transmitting its position may be determined by receiving position information of neighboring terminals located close to the terminal.

18 Claims, 7 Drawing Sheets

METHOD AND SYSTEM FOR ACQUIRING POSITION OF TERMINAL

CROSS REFERENCE TO RELATED APPLICATION

This application claims priority from and the benefit of Korean Patent Application No. 10-2010-0058080, filed on Jun. 18, 2010, which is hereby incorporated by reference for all purposes as if fully set forth herein.

BACKGROUND OF THE INVENTION

1. Field of the Invention

Exemplary embodiments of the present invention relate to a method and system for acquiring a position of a terminal when the terminal cannot locate its position.

2. Description of the Background

In general, terminals, such as a personal computer (PC) and a notebook, are connected to the Internet using an internet protocol (IP) address. Accordingly, various portal systems providing search services and contents can be informed of positions of the terminals using the IP addresses of the terminals.

Recently, with activation of local communities of regions to which the terminals belong to, user demand for information on the local communities is increasing. Accordingly, there is a demand for various portal systems to provide information on, for example, real estate and weather, of the regions corresponding to the terminals, as well as information on the local communities.

Local information may include information on a particular region (e.g., zone, area, city, state) corresponding to a terminal and may be provided based on a position of the terminal. Conventionally, the position of a terminal is determined based on an IP address of the terminal. However, the IP address can be incorrect or may not be attainable according to a network environment of the terminal. In such cases, the various portal systems cannot identify the correct position of a terminal, thereby causing difficulty in providing local information to a user.

Accordingly, there is a desire for a new scheme for acquiring accurate position information of the terminal.

SUMMARY OF THE INVENTION

Exemplary embodiments of the present invention provide a method and system for acquiring a position of a terminal that cannot determine a position of the terminal.

Additional features of the invention will be set forth in the description which follows, and in part will be apparent from the description, or may be learned by practice of the invention.

Exemplary embodiments of the invention disclose a method for determining position information of a terminal. The method includes requesting position information of a first terminal, and receiving, via the first terminal, position information of a second terminal. Receiving the position information of the second terminal includes receiving the position information of the second terminal using an application in the second terminal.

Exemplary embodiments of the present invention also disclose a system for determining a position of a terminal. The system includes a position information requesting unit to request position information of a first terminal, and a position information receiving unit to receive, via the first terminal, position information of a second terminal. The position information receiving unit receives the position information of the neighboring terminal using an application in the second terminal.

Exemplary embodiments of the present invention also disclose a method for determining position information of a terminal. The method includes identifying a user of a first terminal that cannot transmit position information of the first terminal. The identifying is based on a request for the position information of the terminal. The method further includes requesting a mobile terminal for position information of the mobile terminal, and receiving the position information of the mobile terminal from the mobile terminal.

Exemplary embodiments of the present invention also disclose a system for determine position information of a terminal. The system includes a user identifying unit, a position information requesting unit, and a position information receiving unit. The user identifying unit identifies a user of a first terminal according to a request for position information of the first terminal. The position information requesting unit requests position information of a mobile terminal. The position information receiving unit receives the position information of the mobile terminal from the mobile terminal. The first terminal cannot transmit the position information of the first terminal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
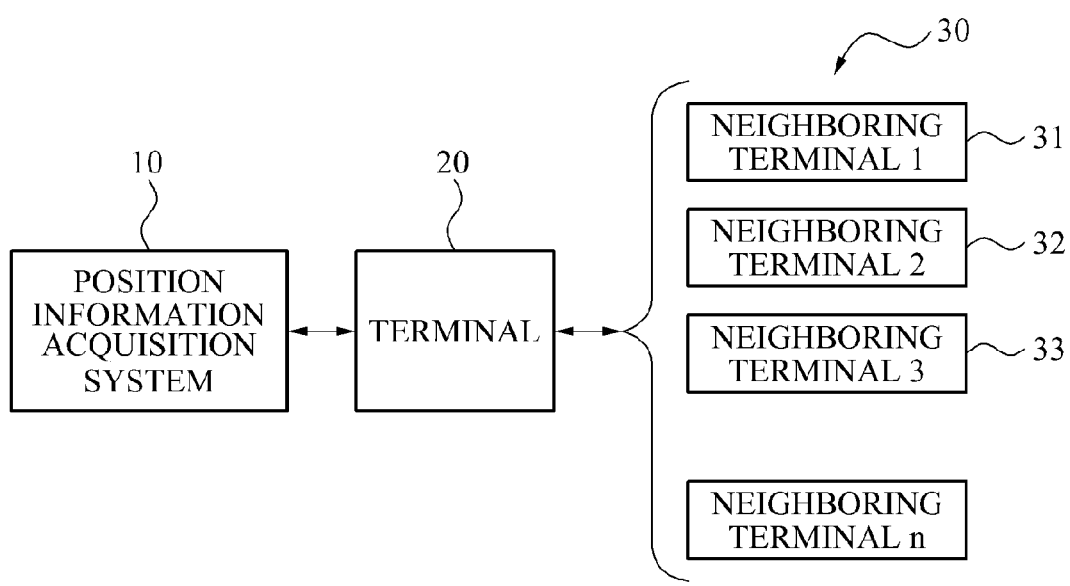
FIG. 1 is a diagram illustrating an overall structure of a position information acquisition system according to exemplary embodiments of the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing exemplary embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, exemplary embodiments of the present invention will be described in detail with reference to the accompanying drawings.

FIG. 1 illustrates an overall structure of a position information acquisition system 10 according to exemplary embodiments of the present invention.

The position information acquisition system 10 may request a terminal 20 for position information of the terminal 20. The terminal 20 may be any device that cannot acquire its position information due to a lack of or a malfunctioning position determination module (e.g., a Global Positioning System (GPS) module). The terminal 20 may be, but is not limited to, any one of a desktop computer, a notebook computer, an mp3 player, an internet TV, an electronic pad, and a smart phone.

The terminal 20 may search for neighboring terminals 30 located close to the terminal 20. For example, the neighboring terminals 30 may be within a predetermined distance of terminal 20. The predetermined distance may be determined by a network to which terminal 20 is connected to, or may be set to a particular distance (e.g., 10 meters, 50 feet). In addition, the terminal 20 may transmit a message to the neighboring terminals 30 being searched, to inquire whether transmission of position information of the neighboring terminals 30 is available. The terminal 20 may select one of the neighboring terminals 30 which transmitted a response message indicating that transmission of the position information is available.

The terminal 20 may request the selected neighboring terminal for position information of the selected neighboring terminal. Subsequently, the selected neighboring terminal may acquire the position information using any position determination module (e.g., a GPS module, a Wi-Fi positioning system (WPS) module, and a cell-tower), and transmit the position information of the selected neighboring terminal to the terminal 20. The neighboring terminals 30 may include, but are not limited to, a mobile terminal such as a mobile phone, a digital multimedia broadcasting (DMB) phone, a smart phone, and a navigation device. In general, a neighboring terminal 30 may be any portable electronic device having an ability to determine its own position information and an ability to communicate with terminal 20.

The terminal 20 may transmit the position information of the selected neighboring terminal to the position information acquisition system 10. The position information acquisition system 10 may determine a position of the terminal 20 based on the position information of the selected neighboring terminal. Additionally, the position information acquisition system 10 may provide the terminal 20 with a search service corresponding to the position of the terminal 20, using the determined position of the terminal 20.

Hereinafter, processes for acquiring a position of a terminal will be described in detail with reference to FIG. 2.

Figure 2:
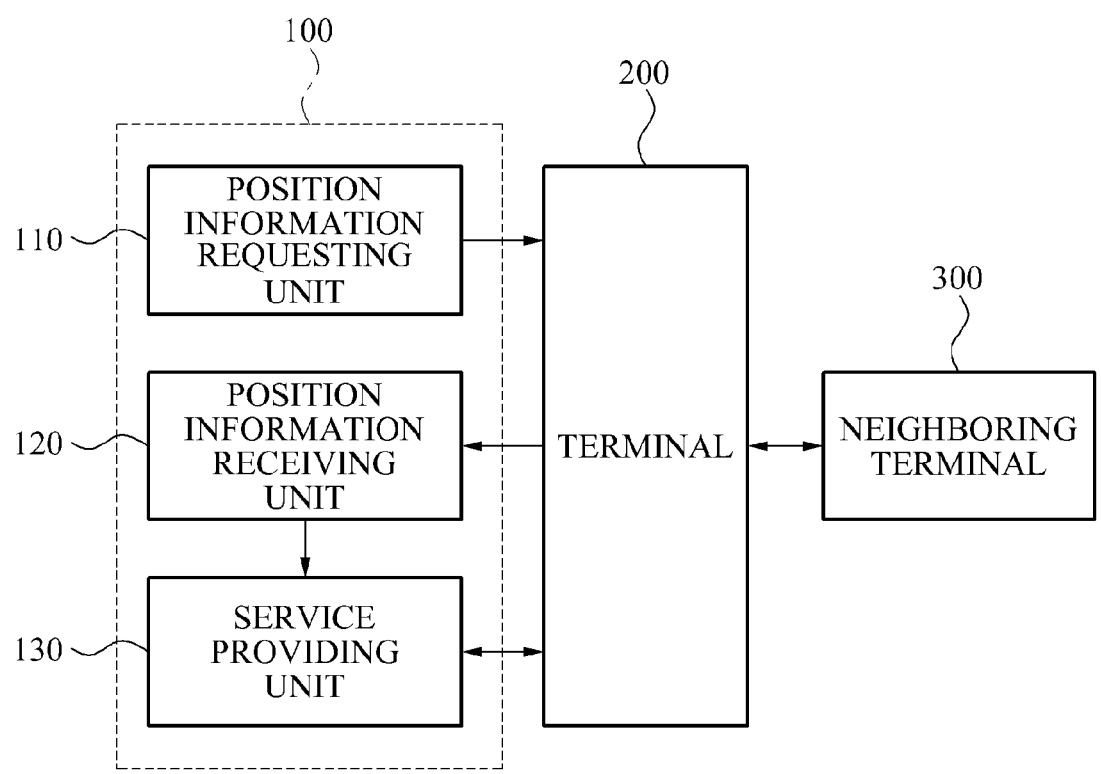
FIG. 2 is a block diagram illustrating a structure of a position information acquisition system according to exemplary embodiments of the present invention.

FIG. 2 is a block diagram illustrating a structure of a position information acquisition system 100 according to exemplary embodiments of the present invention.

Referring to FIG. 2, the position information acquisition system 100 may include a position information requesting unit 110, a position information receiving unit 120, and a service providing unit 130. The position information acquisition system 100 may be any electronic device capable of communicating with terminal 200. The position information acquisition system 100 may also be connected to a server or network (e.g., internet). The position information acquisition system 100 may include hardware and software components. For example, the position information acquisition system 100 may include a processor and a transceiver for processing, sending, and receiving messages transceived to/from terminal 200. The position information acquisition system 100 may also include computer-readable medium configured to process signals and information received from terminal 200 and any other network or server the position information acquisition system 100 is connected to.

The position information requesting unit 110 may request position information of a terminal 200 from the terminal 200. The terminal 200 may be any device that cannot acquire its position information due to lack of or a malfunctioning position determination module (e.g., a GPS module, a WPS module). The terminal 200 may be, but is not limited to, any one of a desktop computer, a notebook computer, an mp3 player, an internet TV, an electronic pad, and a smart phone.

According to the request for the position information, the terminal 200 may search for neighboring terminals located close to the terminal 200. For example, the neighboring terminals may be within a predetermined distance of terminal 200. The predetermined distance may be determined by a network to which terminal 200 is connected to, or may be set to a particular distance (e.g., 10 meters, 50 feet). For the search, the terminal 200 may use wired or wireless networks, such as a local area network (LAN), a Wireless Fidelity (Wi-Fi) network, a Wireless Broadband (Wibro) network, Bluetooth, and/or a beacon signal.

For example, in some cases, the terminal 200 may search for the neighboring terminals in connection with the terminal 200 using a LAN.

In some cases, the terminal 200 may search for the neighboring terminals located close to the terminal 200 using near-field communication (NFC) such as the Bluetooth.

The terminal 200 may transmit to the neighboring terminals being searched, a message inquiring whether transmission of position information of the neighboring terminals is available.

The terminal 200 may select one of the neighboring terminals that responds and indicates that transmission of the position information is available. For example, the terminal 200 may select a closest one from the neighboring terminals that responded. In some cases, the terminal 200 may select a most reliable one of the neighboring terminals that responded. The most reliable neighboring terminal may refer to a terminal acquiring its position information using a position determination module (e.g., GPS module, WPS module, cell-tower).

The terminal 200 may request position information of a selected neighboring terminal 300 from the selected neighboring terminal 300.

According to the request, the selected neighboring terminal 300 may acquire the position information of the selected neighboring terminal 300 from a base station or a satellite connected to the selected neighboring terminal 300, using a position determination module (e.g., GPS module, WPS module, or cell-tower). The position information of the selected neighboring terminal 300 may be obtained based on a position of the selected neighboring terminal 300 that has been calculated or determined by the base station or the satellite. For example, the selected neighboring terminal 300 may obtain its position information based on a position thereof, calculated by triangulation.

Referring back to FIG. 2, the position information receiving unit 120 may receive, through the terminal 200, the position information of the selected neighboring terminal 300 obtained by the selected neighboring terminal 300. For example, the terminal 200 may receive the position information of the selected neighboring terminal 300 from the selected neighboring terminal 300, and transmit the position information to the position information receiving unit 120.

The position information receiving unit 120 may determine a position of the terminal 200 based on the transmitted position information of the selected neighboring terminal 300. The position information may include a geographical coordinate value indicating the position of the selected neighboring terminal 300. For example, the position information receiving unit 120 may determine the position of the selected neighboring terminal 300 as the position of the terminal 200.

The service providing unit 130 may provide a search service corresponding to the determined position of the terminal 200. The service providing unit 130 may be connected to a server or network, such as the internet, to provide information associated with the search service.

For example, the search service may be provided through search categories such as local information and weather information of a region to which the terminal 200 belongs to. The search categories may be generated based on the position of the terminal 200 (or neighboring terminal 300). The local information may include, but is not limited to, information on hospitals, real estate agents, restaurants, academies, buses, and sports teams/news of the region corresponding to the terminal.

In addition to the search service, the service providing unit 130 may provide various services such as a target commercial service, a social network service (SNS), and/or a map service, which are based on the determined position information of the terminal 200 (or neighboring terminal 300).

Figure 3:
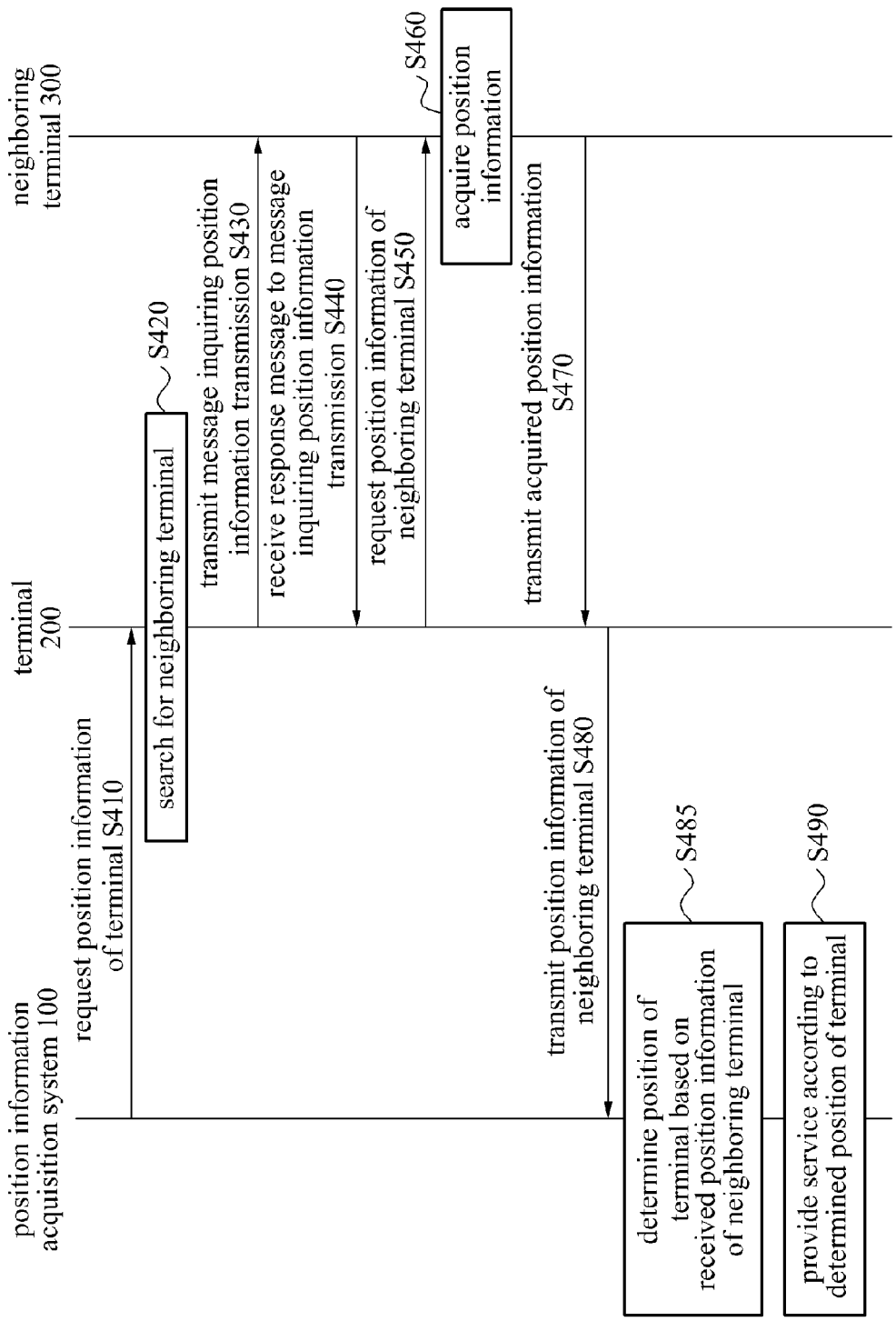
FIG. 3 is a flowchart illustrating an operation of acquiring position information in a position information acquisition system according to exemplary embodiments of the present invention.

FIG. 3 is a flowchart illustrating an operation of acquiring position information in the position information acquisition system according to exemplary embodiments of the present invention.

According to FIG. 3, a position information requesting unit 110 may request position information of a terminal 200 from the terminal 200 in S410. The terminal 200 may be any device that cannot acquire its own position information due to lack of or a malfunctioning position determination module (e.g., a GPS module, a WPS module). The terminal 200 may be, but is not limited to, any one of a desktop computer, a notebook computer, an mp3 player, an internet TV, an electronic pad, and a smart phone.

Therefore, the terminal 200 may search for neighboring terminals in connection with the terminal 200 through wired or wireless networks in S420.

Next, the terminal 200 may transmit a transmission inquiry message to the searched neighboring terminals, in S430. The transmission inquiry message may be a message inquiring whether the searched neighboring terminals can acquire or measure their own position information and transmit their respective position information to the terminal 200.

Next, the terminal 200 may receive a response message in response to the transmission inquiry message in S440. For example, the response message may contain data indicating whether the searched neighboring terminals can transmit the position information. In some cases, the terminal 200 may receive response messages from all the searched neighboring terminals. In some cases, the terminal 20 may receive response messages only from certain neighboring terminals that can transmit their position information among the searched neighboring terminals. Since transmission of the response message from a neighboring terminal indicates that the neighboring terminal can transmit its position information, the response message may not contain specific data other than, for example, identification of the terminal the response message is being sent from.

Next, in S450, the terminal 200 may request a neighboring terminal 300 selected from the neighboring terminals based on the response message, for position information of the selected neighboring terminal 300.

Specifically, the terminal 200 may select a neighboring terminal 300 capable of transmitting position information of the neighboring terminal 300 among the searched neighboring terminals, based on the response message. In some cases, the terminal 200 may select a terminal that is closest to the terminal 200 from the neighboring terminals that responded. In some cases, the terminal 200 may select a most-reliable neighboring terminal of the neighboring terminals that responded. The most reliable terminal may refer to a terminal that acquires the position information using a position determination module (e.g., GPS, WPS, or cell-tower).

Next, in S460, the selected neighboring terminal 300 may acquire its position information in accordance with the request by the terminal 200.

The selected neighboring terminal 300 may acquire the position information of the selected neighboring terminal 300 from a base station or a satellite corresponding to the selected neighboring terminal 300 using a position determination module (e.g., GPS, WPS, or cell-tower). In some cases, the selected neighboring terminal 300 may acquire the position information based on a position thereof calculated by triangulation.

Next, the selected neighboring terminal 300 may transmit the acquired position information to the terminal 200 in S470. The position information being transmitted to the terminal 200 may include a coordinate value of the selected neighboring terminal 300.

The terminal 200 may transmit the position information of the selected neighboring terminal 300 received from the selected neighboring terminal 300 to the position information acquisition system 100, in S480.

The position information receiving unit 120 may receive the position information of the selected neighboring terminal 300, and determine a position of the terminal 200 based on the received position information, in S485. For example, since the selected neighboring terminal 300 is likely to be located close to the terminal 200, the position information receiving unit 120 may determine the position of the selected neighboring terminal 300 as the position of the terminal 200.

Next, the service providing unit 130 may provide a search service according to the determined position of the terminal 200, in S490.

For example, the service providing unit 130 may generate search categories such as local information and weather information of the region corresponding to the determined position of the terminal 200, using the position of the terminal 200. The local information may include information on hospitals, real estate agents, restaurants, academies, buses, and sports teams/news of the region corresponding to the determined position of the terminal 200.

In addition to the search service, the service providing unit 130 may provide various services such as a target commercial service, an SNS, and a map service, which are based on the determined position information of the terminal 200.

When a user of terminal 200 requests a search to be conducted according to the position of the terminal 200 through the terminal 200, the service providing unit 130 may provide the terminal 200 with the search service corresponding to the requested search. For example, the service providing unit 130 may display the weather information of the region corresponding to the determined position of the terminal 200 on a screen of the terminal 200.

Referring to FIG. 2 and FIG. 3, in some cases, the position information receiving unit 120 may receive, via terminal 200, position information of the selected neighboring terminal 300 using an application in the selected neighboring terminal 300. The application may automatically perform processes for providing the position information of the selected neighboring terminal 300.

For example, when the position information of the selected neighboring terminal 300 is requested by the terminal 200, the application installed in the selected neighboring terminal 300 may be executed. The selected neighboring terminal 300 may then automatically acquire the position information of the selected neighboring terminal 300, and automatically transmit the acquired position information to the terminal 200. The position information receiving unit 120 may then receive the position information of the selected neighboring terminal 300 through the terminal 200.

According to the above description made with reference to FIG. 1, FIG. 2, and FIG. 3, when a terminal 200 cannot measure or acquire its own position information, the position information acquisition system 100 receives, through the terminal 200, the position information of a neighboring terminal 300 that can measure or acquire position information of the neighboring terminal 300, and determines the position of the terminal 200 based on the position information of the neighboring terminal 300. Hereinafter, processes of the position information acquisition system 100 for receiving a position of a mobile terminal directly from the mobile terminal that can measure or acquire its own position information will be explained.

Figure 4:
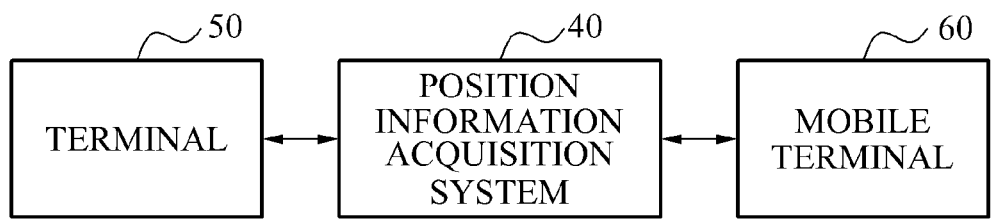
FIG. 4 is a block diagram illustrating a structure of a position information acquisition system for acquiring position information from a mobile terminal according to exemplary embodiments of the present invention.

FIG. 4 is a block diagram illustrating a position information acquisition system 40 for acquiring position information from a mobile terminal 60, according to exemplary embodiments of the present invention.

Referring to FIG. 4, a terminal 50 may request position information of the terminal 50 from the position information acquisition system 40. The position information acquisition system 40 may identify a user of the terminal 50 using an identification method, such as a public key-based method. In general, any suitable identification method may be used. The user identification information may be stored in the position information acquisition system 40.

The position information acquisition system 40 may then obtain information (i.e., mobile terminal information) on a mobile terminal 60 of the user using user log information according to the user identification result. The mobile terminal information may include a number, for example, a phone number of the mobile terminal 60. The mobile terminal 60 may be a device carried by the user at any time, such as a mobile phone, a smart phone, a laptop, or an electronic pad. In general, the mobile terminal 60 may be any portable electronic device that can communicate with the position information acquisition system 40. When the user is using terminal 50, mobile terminal 60 may, in some cases, be located at a short distance from the terminal 50. For example, the mobile telephone 60 may be located within a predetermined distance of terminal 50. The predetermined distance may be determined by a network to which terminal 50 is connected to, or may be set to a particular distance (e.g., 10 meters, 50 feet).

The position information acquisition system 40 may request, from the mobile terminal 60, the position information of the mobile terminal 60 using, in part, the obtained mobile terminal information. The position information acquisition system 40 may determine a position of the terminal 50 using the position information of the mobile terminal 60, received from the mobile terminal 60. The position information acquisition system 40 may request or acquire the position information of the mobile terminal 60 using a call-back URL or a background application. This will be described in further detail with reference to FIG. 5, FIG. 6, and FIG. 7.

In addition, the position information acquisition system 40 may provide the terminal 50 with a search service according to the determined position of the terminal 50.

Figure 5:
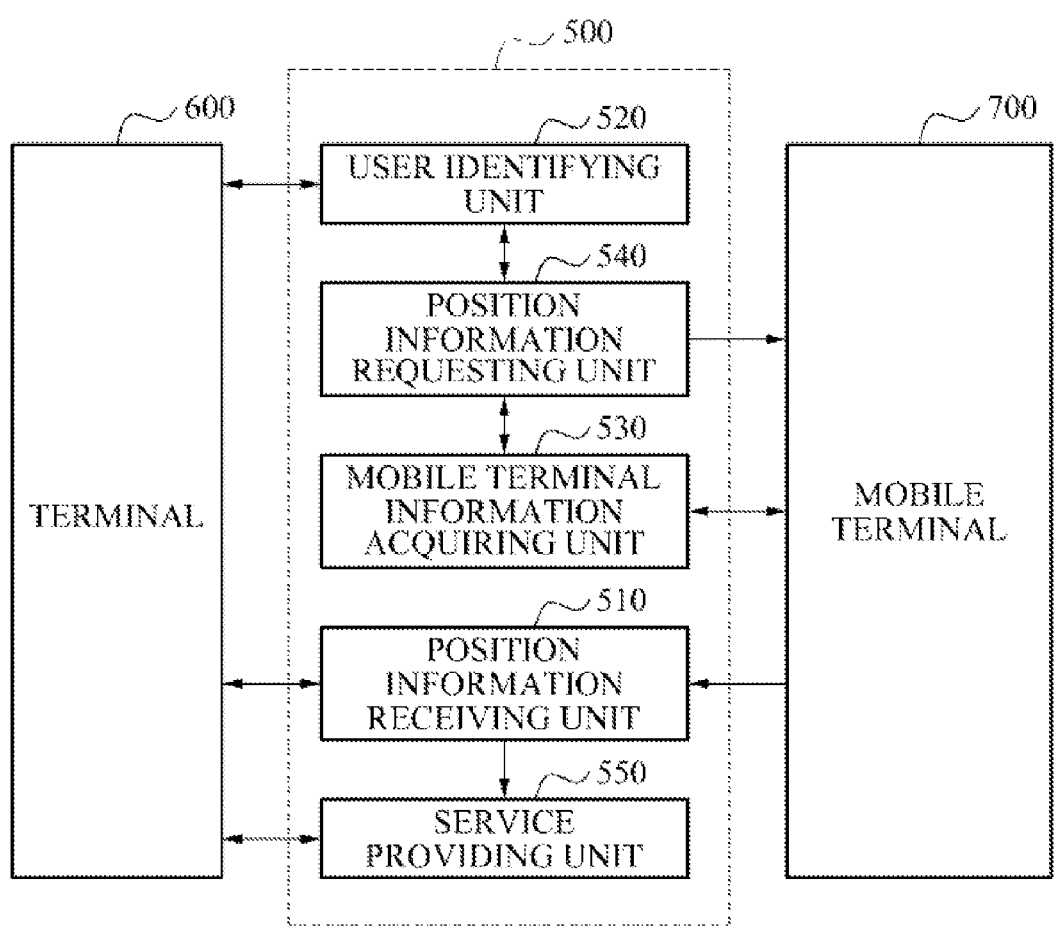
FIG. 5 is a block diagram illustrating a structure of a position information acquisition system for acquiring position information from a mobile terminal according to exemplary embodiments of the present invention.

FIG. 5 is a block diagram illustrating a structure of a position information acquisition system 500 for acquiring position information from a mobile terminal 700, according to exemplary embodiments of the present invention. The position information acquisition system 500 may be any electronic device capable of communicating with multiple terminals (e.g., terminals 600, 700). The position information acquisition system 500 may also be connected to a server or network (e.g., internet). The position information acquisition system 500 may include hardware and software components. For example, the position information acquisition system 500 may include a processor and a transceiver for processing, sending, and receiving messages transceived to/from multiple terminals. The position information acquisition system 500 may also include computer-readable medium configured to process signals and information received from terminals 600, 700 and any other network or server the position information acquisition system 500 is connected to.

Referring to FIG. 5, the position information acquisition system 500 may include a position information receiving unit 510, a user identifying unit 520, a mobile terminal information acquiring unit 530, a position information requesting unit 540, and a service providing unit 550.

The position information receiving unit 510 may receive a request for position information of a terminal 600 from the terminal 600. The terminal 600 may be any device that cannot acquire its position information. The terminal 600 may be a desktop computer, a laptop computer, an mp3 player, an internet TV, an electronic pad, and/or a smart phone.

The user identifying unit 520 may identify a user of the terminal 600 based on the request for the position information of the terminal 600. The user identifying unit 520 may use an identification method, such as a public key-based method. In general, any suitable identification method may be used to identify the user of terminal 600. The user identification information may be stored in the position information acquisition system 500. When the user identifying unit 520 fails in the user identification, the user identifying unit 520 may continue to attempt user identification for a predetermined number of times. When the user identifying unit 520 continuously (i.e., after the predetermined number of times) fails in the user identification, the user identifying unit 520 may terminate communication with the terminal 600.

After identifying the user of terminal 600, the mobile terminal information acquiring unit 530 may obtain information (i.e., mobile terminal information) on a mobile terminal 700 based on user log information according to the user identification result. For example, when the user identification is obtained, the mobile terminal information acquiring unit 530 may acquire a phone number of the mobile terminal 700 using the user log information.

The position information requesting unit 540 may request the mobile terminal 700 for position confirmation of the mobile terminal 700 using the obtained mobile terminal information.

In some cases, the position information requesting unit 540 may request the position confirmation of the mobile terminal 700 by transmitting a call-back URL to the mobile terminal 700. The position information requesting unit 540 may transmit the call-back URL to the mobile terminal 700 using any suitable method, including, but not limited to, a short message service (SMS) and a push notification. Accordingly, when the mobile terminal 700 can measure or acquire the position information of the mobile terminal 700, the mobile terminal 700 may execute a web browser application and load a webpage to transmit the position information to the position information acquisition system 500.

The position information requesting unit 540 may expose, through the mobile terminal 700, a web page requesting agreement for provision of the position information of the mobile terminal 700. If the user of mobile terminal 700 agrees (i.e., consents) to the agreement, the user consent is sent to the position information acquisition system 500, and the user web page requesting agreement for provision of the position information may be omitted according to an option set by the user.

According to the agreement for provision of the position information of the mobile terminal 700, the position information receiving unit 510 may receive position information of the mobile terminal 700 from the mobile terminal 700. For example, the mobile terminal 700 may transmit the position information of the mobile terminal 700 to the position information acquisition system 500 using the call-back URL, or may directly calculate the position information by triangulation.

In some cases, the position information requesting unit 540 may request the position information of the mobile terminal 700 using a background application. The background application may be an application for transmitting or acquiring the position information of the mobile terminal 700. The background application may be preloaded to the mobile terminal 700, or may be downloaded using a market or a portal and then preinstalled in the mobile terminal 700. The position information requesting unit 540 may expose a webpage inquiring about the agreement for provision of the position information of the mobile terminal 700 from the mobile terminal 700. The webpage may be exposed through the mobile terminal 700 using the background application.

According to the agreement for provision of the position information of the mobile terminal 700, the position information receiving unit 510 may receive the position information acquired from the mobile terminal 700. For example, the mobile terminal 700 may transmit the position information to the position information acquisition system 500 using the preinstalled background application.

In addition, the position information receiving unit 510 may determine the position information of the terminal 600 using the position information of the mobile terminal 700. For example, the position information receiving unit 510 may determine a position of the mobile terminal 700 as a position of the mobile 600.

Accordingly, the service providing unit 550 may generate search categories according to the determined position of the terminal 600 and provide a search service to the terminal 600. For example, the search service provided to the terminal 600 may include local information and weather information of the region corresponding to the determined position of the terminal 600.

When the call-back URL is used, the position information of the mobile terminal 700 is acquired by transmitting the call-back URL whenever the position information is needed, executing a web browser application, and loading a corresponding webpage indicating the position of mobile terminal 700. When a background application is used, the position information of the mobile terminal 700 is acquired by executing only the background application whenever the position information is needed. Therefore, a load of the position information acquisition system 500 may be reduced if using a background application.

Figure 6:
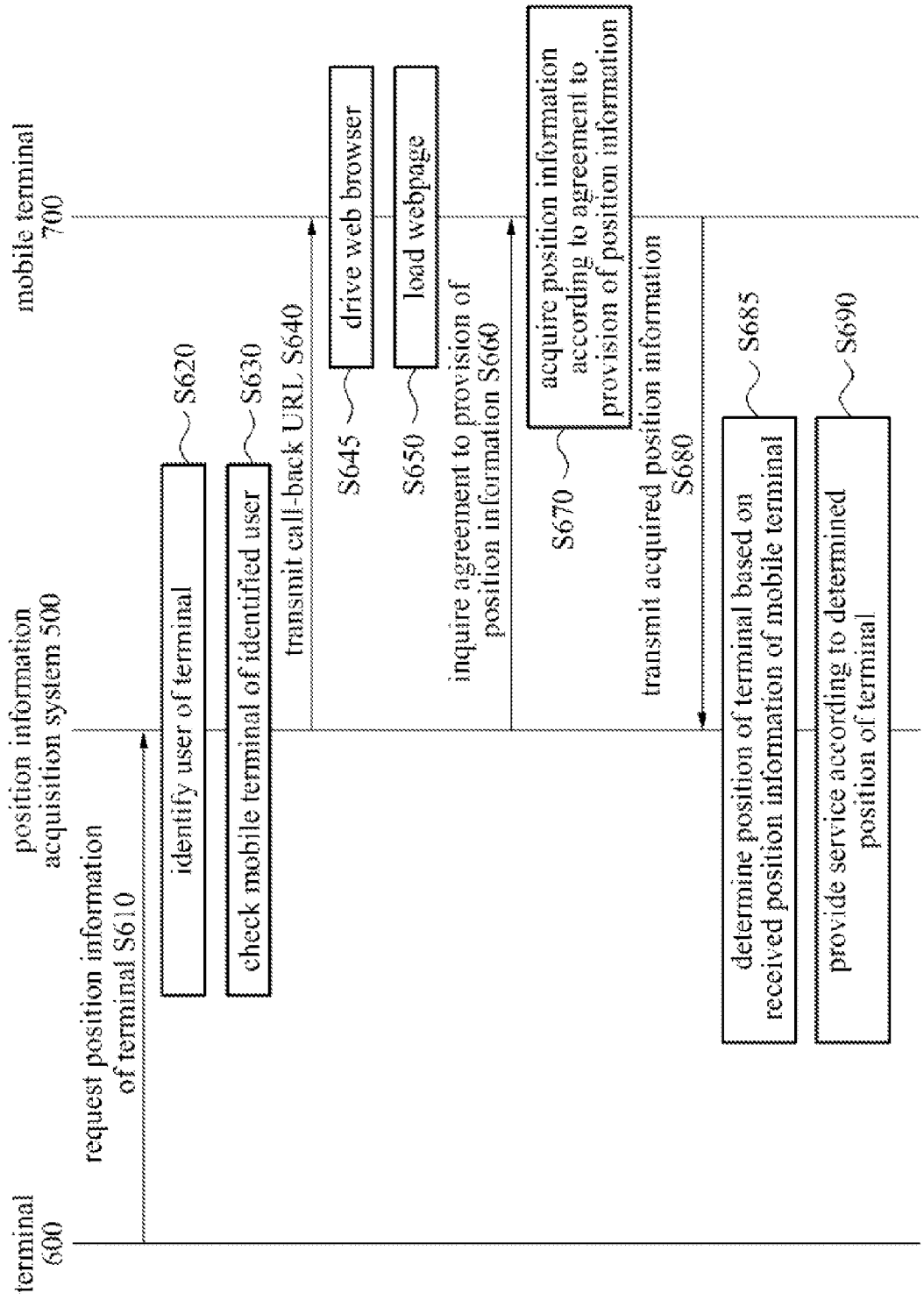
FIG. 6 is a flowchart illustrating a process of acquiring position information using a call-back uniform resource locator (URL) according to exemplary embodiments of the present invention.
Figure 7:
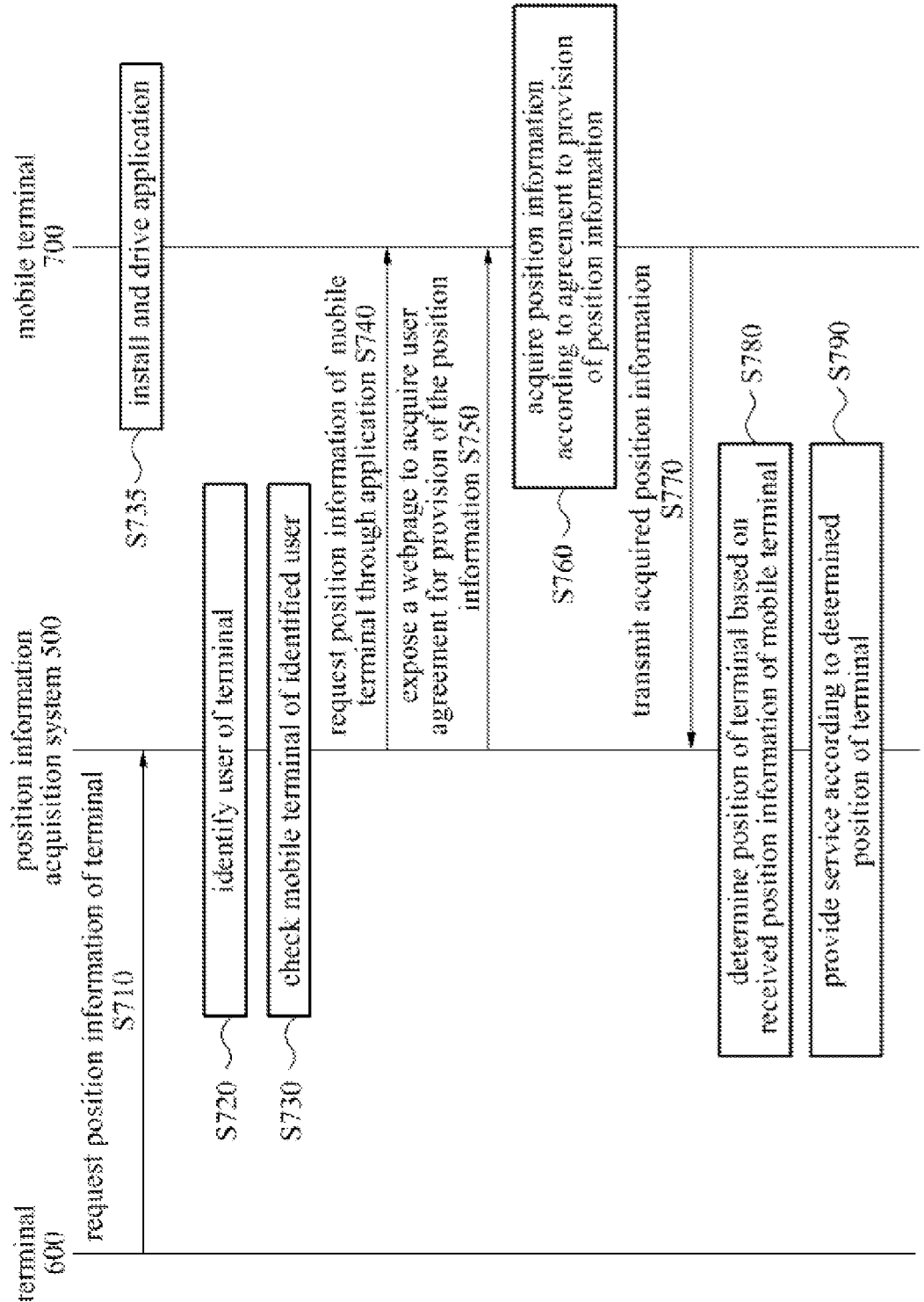
FIG. 7 is a flowchart illustrating a process of acquiring position information using a background application according to exemplary embodiments of the present invention.

FIG. 6 is a flowchart illustrating a process of acquiring position information using a call-back URL, according to exemplary embodiments of the present invention. FIG. 7 is a flowchart illustrating a process of acquiring position information using a background application, according to exemplary embodiments of the present invention.

Referring to FIG. 6 and FIG. 7, a terminal 600 may request position information of the terminal 600 from a position information acquisition system 500, in S610 and S710. The position information receiving unit 510 may receive, from the terminal 600, the request for the position information of the terminal 600.

The user identifying unit 520 may identify a user of the terminal 600 requesting the position information, in S620 and S720.

Next, in S630 and S730, the mobile terminal information acquiring unit 530 may acquire mobile terminal information using user log information according to the user identification result. For example, when the user identification is successful, the mobile terminal information acquiring unit 530 may acquire a phone number of the mobile terminal 700 of the user using the user log information. Accordingly, the terminal information requesting unit 540 may request the mobile terminal 700 for confirmation of a position of the mobile terminal 700.

Referring to FIG. 6, the terminal information requesting unit 540 may request confirmation of the position of the mobile terminal 700, by transmitting a call-back URL to the mobile terminal 700, in S640. The mobile terminal 700 may execute a web browser application in response to the request in S645, and load a webpage. In addition, in S660, the position information requesting unit 540 may expose a webpage inquiring whether the user of terminal 700 agrees to provisioning the position information of the mobile terminal 700. After obtaining the agreement for provision of the position information, the mobile terminal 700 may acquire the position information of mobile terminal 700 through a corresponding base station or satellite in S670, and transmit the acquired position information to the position information acquisition system 500 in S680.

Referring to FIG. 7, in some cases, the position information requesting unit 540 may request position information of the mobile terminal 700 using a preinstalled background application, in S740. The background application may be an application for measuring and/or transmitting the position of the mobile terminal 700. The position information requesting unit 540 may confirm that transmission of the position information is available through the background application. Also, the position information requesting unit 540 may expose a webpage to acquire user agreement for provisioning the position information of the mobile terminal 700, in S750. When the user of the mobile terminal 700 agrees to provisioning the position information of the mobile terminal 700, the mobile terminal 700 may acquire the position information through a corresponding base station or satellite in S760, and transmit the acquired position information to the position information acquisition system 500 in S770.

Next, referring to FIG. 6 and FIG. 7, the position information receiving unit 510 may determine a position of the terminal 600 based on the position information of the mobile terminal 700 received from the mobile terminal 700, in S685 and S780. For example, the position information receiving unit 510 may determine the position of the mobile terminal 700 as the position of the mobile 600.

In addition, the service providing unit 550 may provide the terminal 600 with a search service according to the determined position of the terminal 600, in S690 and S790. For example, the service providing unit 550 may generate search categories such as local information and weather information of the region corresponding to the determined position of the terminal 600. Also, when the user requests the local information through the terminal 600, the service providing unit 550 may display the local information of the region corresponding to the terminal 600 among the search categories, on a screen of the terminal 600.

The above-described exemplary embodiments of the present invention may be recorded, at least in part, in non-transitory computer-readable media including program instructions to implement various operations embodied by a computer. The media may also include, alone or in combination with the program instructions, data files, and data structures. The program instructions recorded on the media may be those specially designed and constructed for the purposes of the exemplary embodiments, or they may be of the kind well-known and available to those having skill in the computer software arts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for determining position information of a first terminal, the method comprising:
    transmitting an inquiry message to at least one terminal to inquire whether the at least one terminal can determine a location of the at least one terminal;
    selecting, by the first terminal, a second terminal from the at least one terminal based on at least one reply received in response to the inquiry message;
    requesting the selected second terminal for position information of the second terminal, the second terminal being within a determined distance of the first terminal and having an ability to determine the position information of the second terminal, and the first terminal being unable to acquire the position information of the first terminal;
    receiving the position information of the second terminal from the second terminal;
    transmitting, by the first terminal, the position information of the second terminal; and
    determining a position of the first terminal based on the position information of the second terminal,
    wherein receiving the position information of the second terminal comprises receiving the position information of the second terminal using an application in the second terminal.

2. The method of claim 1, further comprising:
    providing the first terminal with a search service using at least one of weather and regional information according to the position of the first terminal, the position being determined
    based on the received position information of the second terminal.

3. A system to determine a position of a first terminal, the system comprising:
    a position information requesting unit to request position information of the first terminal; and
    a position information receiving unit to receive position information of a second terminal from the first terminal and to determine the position of the first terminal based on the position information of the second terminal, the second terminal being within a determined distance of the first terminal and having an ability to determine the position information of the second terminal, and the first terminal being unable to acquire the position information of the first terminal,
    wherein the position information receiving unit is configured to receive the position information of the second terminal using an application in the second terminal, and
    wherein the first terminal is configured to transmit an inquiry message to at least one terminal to inquire whether the at least one terminal can determine a location of the at least one terminal, to determine that the second terminal has the ability to determine the position information of the second terminal in response to the inquiry message, and to select the second terminal for location determination.

4. The system of claim 3, further comprising a service providing unit to provide the first terminal with a search service using at least one of weather and regional information according to the position of the first terminal, the position being determined based on the received position information of the second terminal.

5. A method for determining position information of a first terminal, the method comprising:
    identifying a user of the first terminal, the first terminal not being able to transmit and acquire the position information of the first terminal, the identifying being based on receiving a request for the position information of the first terminal;
    requesting a mobile terminal for position information of the mobile terminal, the mobile terminal being within a determined distance of the first terminal and having an ability to determine the position information of the mobile terminal;
    receiving the position information of the mobile terminal from the mobile terminal; and
    determining a position of the first terminal based on the position information of the mobile terminal, wherein requesting the position information of the mobile terminal comprises:
obtaining mobile terminal information associated with the mobile terminal according to a result of the identifying of the user of the first terminal.

6. The method of claim 5, wherein requesting the position information of the mobile terminal further comprises:
transmitting a call-back uniform resource locator (URL) to the mobile terminal according to the mobile terminal information.

7. The method of claim 6, wherein receiving the position information of the mobile terminal comprises:
executing a webpage application requesting agreement for provision of the position information of the mobile terminal using the transmitted call-back URL; and
receiving the position information of the mobile terminal in accordance with the agreement.

8. The method of claim 5, wherein requesting the position information of the mobile terminal further comprises:
requesting the position information of the mobile terminal using an application in the mobile terminal to transmit the position information of the mobile terminal, according to the acquired mobile terminal information.

9. The method of claim 8, wherein receiving the position information of the mobile terminal comprises:
executing a webpage application requesting agreement for provision of the position information of the mobile terminal, using the application for transmitting the position information; and
receiving the position information of the mobile terminal in accordance with the agreement.

10. The method of claim 5, further comprising providing the first terminal with a search service using at least one of weather and regional information according to the position of the first terminal, the position being determined based on the received position information of the mobile terminal.

11. A non-transitory computer readable recording medium to store a program comprising instructions, that when executed by a computer, implement the method of claim 5.

12. A system to determine position information of a first terminal, the system comprising:
a user identifying unit to identify a user of a first terminal according to a request for the position information of the first terminal;
a position information requesting unit to request position information of a mobile terminal, the mobile terminal being within a determined distance of the first terminal and having an ability to determine the position information of the mobile terminal;
a mobile terminal information acquiring unit to acquire mobile terminal information associated with the mobile terminal according to a result of the identification of the user of the first terminal; and
a position information receiving unit to receive the position information of the mobile terminal from the mobile terminal and to determine a position of the first terminal based on the position information of the mobile terminal,
wherein the first terminal is not configured to transmit and acquire the position information of the first terminal.

13. The system of claim 12,
wherein the position information requesting unit is configured to transmit a call-back uniform resource locator (URL) to the mobile terminal according to the mobile terminal information.

14. The system of claim 13, wherein the position information requesting unit is configured to execute a webpage application requesting agreement for provision of the position information of the mobile terminal, using the transmitted call-back URL,
wherein the position information receiving unit is configured to receive the position information of the mobile terminal acquired by the mobile terminal in accordance with the agreement of the position information of the mobile terminal.

15. The system of claim 12,
wherein the position information requesting unit is configured to request the position information of the mobile terminal using an application in the mobile terminal to transmit the position information of the mobile terminal, according to the acquired mobile terminal information.

16. The system of claim 15, wherein the position information requesting unit is configured to execute a webpage application requesting agreement for provision of the position information of the mobile terminal, using the application to transmit the position information of the mobile terminal,
wherein the position information receiving unit is configured to receive the position information of the mobile terminal from the mobile terminal in accordance with the agreement for provision of the position information of the mobile terminal.

17. The system of claim 12, further comprising:
a service providing unit to provide a search service using at least one of weather and regional information according to the position of the first terminal, the position being determined based on the received position information of the mobile terminal.

18. The system of claim 15, wherein the mobile terminal information associated with the mobile terminal is acquired based on user log information according to the result of the identification of the user of the first terminal.

* * * * *